United States Patent
Hildebrand

[11] 3,889,226
[45] June 10, 1975

[54] SCANNED HOLOGRAPHY BY SECTOR SCANNING

[75] Inventor: Bernard P. Hildebrand, Richland, Wash.

[73] Assignee: Battelle Development Corporation, Richland, Wash.

[22] Filed: Sept. 12, 1973

[21] Appl. No.: 396,414

Related U.S. Application Data

[63] Continuation-in-part of Ser. No. 166,944, July 28, 1971, Pat. No. 3,760,344.

[52] U.S. Cl. ............... 340/5 H; 73/67.5 H; 343/17; 350/3.5
[51] Int. Cl. .............................................. G01s 9/66
[58] Field of Search ........ 340/5 H; 343/17; 350/3.5; 73/67.5 H

[56] References Cited
UNITED STATES PATENTS

| | | | |
|---|---|---|---|
| 3,640,598 | 2/1972 | Neeley et al. | 350/3.5 |
| 3,760,344 | 9/1973 | Hildebrand | 340/5 H |

*Primary Examiner*—Richard A. Farley
*Attorney, Agent, or Firm*—Woodcock, Washburn, Kurtz & Mackiewicz

[57] ABSTRACT

Sector or angular scanning of the source of coherent radiation and/or the receiver provides useful techniques in holography for producing a distortion which can be used to counteract the distortion due to wavelengths disparity in the recording and reconstruction steps. The sector or angular scanning may be performed mechanically or electronically.

15 Claims, 14 Drawing Figures

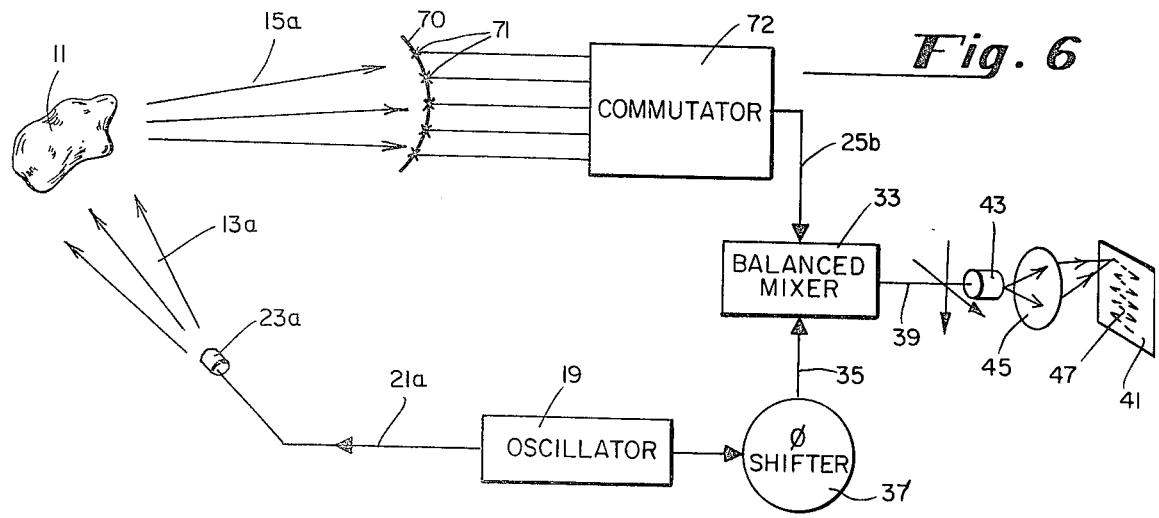
Fig. 6
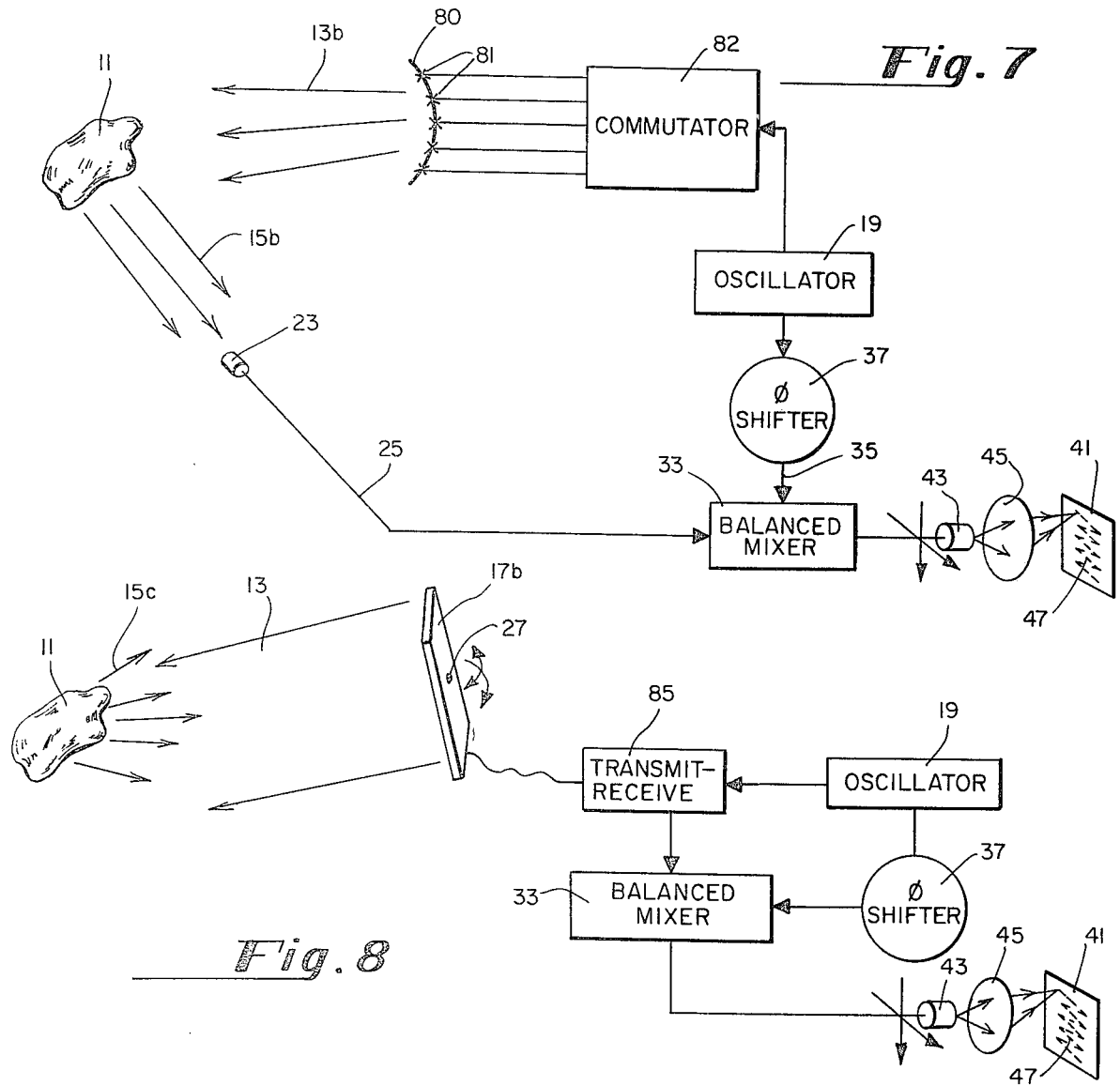
Fig. 7
Fig. 8

SCANNED HOLOGRAPHY BY SECTOR SCANNING

This application is a continuation-in-part of copending parent application Ser. No. 166,944 filed July 28, 1971 now U.S. Pat. No. 3,760,344.

BACKGROUND OF THE INVENTION

This invention relates to improved techniques in the art of holography and more particularly to that type of holography in which scanning techniques are employed.

The basic technique in off-axis holography will be briefly described. As disclosed in U.S. Pat. No. 3,506,327, two coherent radiation beams are brought together with a finite angle therebetween at a radiation detector to form an interference pattern thereon. For optical holography, the radiation is within the visible region region and the detector is usually photographic film which records the interference pattern between the two light radiation beams. One light beam is modified by the object scene to be recorded and the other light beam serves as a reference beam. After exposure and development of the photographic film, it is illuminated with a light beam similar to the reference beam used in constructing the hologram. The reconstructing light beam is diffracted by the recorded interference pattern into at least one diffracted beam which carries information of the object scene for viewing. An image of the object scene is so viewed in full three-dimensions including parallax effects as if the object scene itself were being viewed.

A further recent improvement in the art of holography involves the use of compressional wave energy, particularly that in the ultrasonic range, and is described in U.S. Pat. No. 3,564,904. Two coherent ultrasonic beams are caused to interfere with each other at an ultrasonic detector. The detector is illuminated with light to view in the optical domain a three-dimensional representation of the object scene. One ultrasonic beam is modified by the object scene and the other serves as a reference beam.

A more recent development in the art of holography involves scanning a substantially point receiver relative to an object scene over a surface where an interference pattern from two radiation beams exists. The received radiation is typically converted into an electrical signal. This signal modulates the intensity of a point light source that is scanned over a photographic film simultaneously with scanning the receiver over its surface. The generally required reference radiation beam may be simulated electronically by a predetermined electrical waveform being mixed with the electrical signal output of the scanning receiver. After the photographic film is fully exposed and developed, images may be holographically reconstructed therefrom in the normal manner. A system of scanned receiver holography used with ultrasonic radiation is described in U.S. Pat. No. 3,559,465.

The aforementioned holographic techniques involve detection of object modified radiation across a two-dimensional aperture. Synthetic aperture techniques have also been employed in holography with object modified radiation being detected at a single point. In one such technique, the object scene illuminating source is scanned over an area relative to an object scene. A substantially point receiver remains fixed relative to the object scene. Such a technique is described more fully in U.S. Pat. No. 3,640,598.

Another synthetic aperture involves fixing an object illuminating source and an object modified radiation point receiver relative to each other. The object is then scanned over a two-dimensional surface area across the object illuminating beam. The scanned surface has a center of curvature at either an apparent point radiation source or the substantially point radiation receiver. This technique is described more fully in U.S. Pat. No. 3,617,754.

In each of the synthetic aperture techniques described above, the holographic information that is obtained makes possible the construction of an optical hologram which has the same characteristics as one produced by other off-axis holographic techniques described above wherein object modified radiation is detected across a two-dimensional surface thereof relative to the object.

SUMMARY OF THE INVENTION

The present invention includes other techniques of synthetic aperture holography from which ordinary holographic information of an object scene is produced. In one form of the invention an object illuminating extended radiation source having a finite size in two-dimensions is rotated about a point in space that is fixed with respect to the object in a manner that the object illuminating radiation beam is scanned over the object. The object illuminating radiation beam is large enough in cross-section to effectively illuminate the entire object scene. A single substantially point radiation receiver is fixed in space relative to the object scene and in the path of object modified radiation.

A reference signal that is mutually coherent with the object illuminating beam is mixed with the object modified radiation that strikes the receiver. This reference signal may be in the form of a radiation beam which intersects the object modified radiation beam at the receiver, or the reference signal may be electronically introduced into the electronic signal generated by the receiver. In either case, the resulting electronic signal provides holographic information of the object which may be recorded in the form of an optical hologram.

The primary application of the techniques of the present invention is in the field of ultrasonic holography because of the ready availability of extended coherent compressional wave energy sources. However, the principles of the present invention are applicable in holography with other types of radiation as well.

In the above form of the invention the extended radiation source may be in the form of a flat extended transducer of finite dimensions or it may be a spherically shaped transducer having a center of curvature which is also the apparent point source of the generated object illuminating beam. When the spherical transducer is used the point about which it is rotated may be any convenient point in space other than the center of curvature of the spherical transducer.

In another form of the invention a reciprocal system may be utilized wherein the source is stationary and the receiver nutates. In this form of the invention the source is a point source which is stationary and the receiver which nutates may be a plain extended receiver or a spherical one as long as the center of curvature of the spherical receiver and the center of nutation do not coincide.

In another form of the invention an electronically scanned array may be used for the spherical source rotation where an array of transducers is built on a solid sector of a sphere and energized sequentially to simulate a rotating spherical source. The sector radius corresponds to the radius about which the spherical source was rotated. Alternatively an electronically sampled receiver array may be utilized which is built on a section of a sphere. With this arrangement the transducers in the receiver array may be sampled sequentially or simultaneously. In another form of the invention the source and the receiver may be the same transducer in a time-sharing mode, both for the single transducer or for the array.

For a more detailed disclosure of the present invention and for various advantages thereof, reference should be had to the following description taken in conjunction with the accompanying drawings.

BRIEF DESCRIPTION OF THE DRAWINGS

FIG. 6 is a schematic diagram of essential elements of a system for practicing another form of the present invention similar to that of FIG. 1 but utilizing a stationary array of point transducers in place of a mechanically scanned transducer receiver of FIG. 3;

FIG. 7 is a schematic diagram of a system for practicing another form of the present invention which is a reciprocal case of the system shown in FIG. 6; and FIG. 8 is a schematic diagram of another form of the invention wherein the source and receiver may be the same transducer in a time-sharing mode.

FIGS. 9–14 are useful in explaining the mathematical analysis of the present invention, while FIG. 9 illustrates the geometry for linear scanned holography;

FIG. 10 is a graph conjugate image distance for the linear scanned hologram;

FIG. 11 is the geometry for convex sector scanned holography;

FIG. 12 is a graph of image distance for convex sector scanned holograms;

FIG. 13 is the geometry for concave sector scanned holography; and

FIG. 14 is a graph of image distance for concave sector scanned holograms.

DESCRIPTION OF THE PREFERRED EMBODIMENTS

The holographic technique whose description is to follow does not depend on the particular wave radiation utilized. The inventive techniques are applicable to the entire spectrum of electromagnetic radiation, including visible light, micro-waves, infra red, ultraviolet, X-rays, radiowaves, etc. The invention is also applicable to all ranges of compressional or acoustic radiation including subsonic, sonic, supersonic, ultrasonic, and hypersonic radiation. The fundamental requirement for producing holographic information is that the wave radiation utilized be coherent so that a specific wavelength can be defined. The specific coherent radiation source and receiver used in a given holographic application depends upon the particular type of wave radiation that is utilized.

The preferred embodiments of the present invention that are described hereinafter in detail utilize compressional wave energy in the ultrasonic range but it will be understood that the present invention is not limited to such a particular system.

Figure 1:
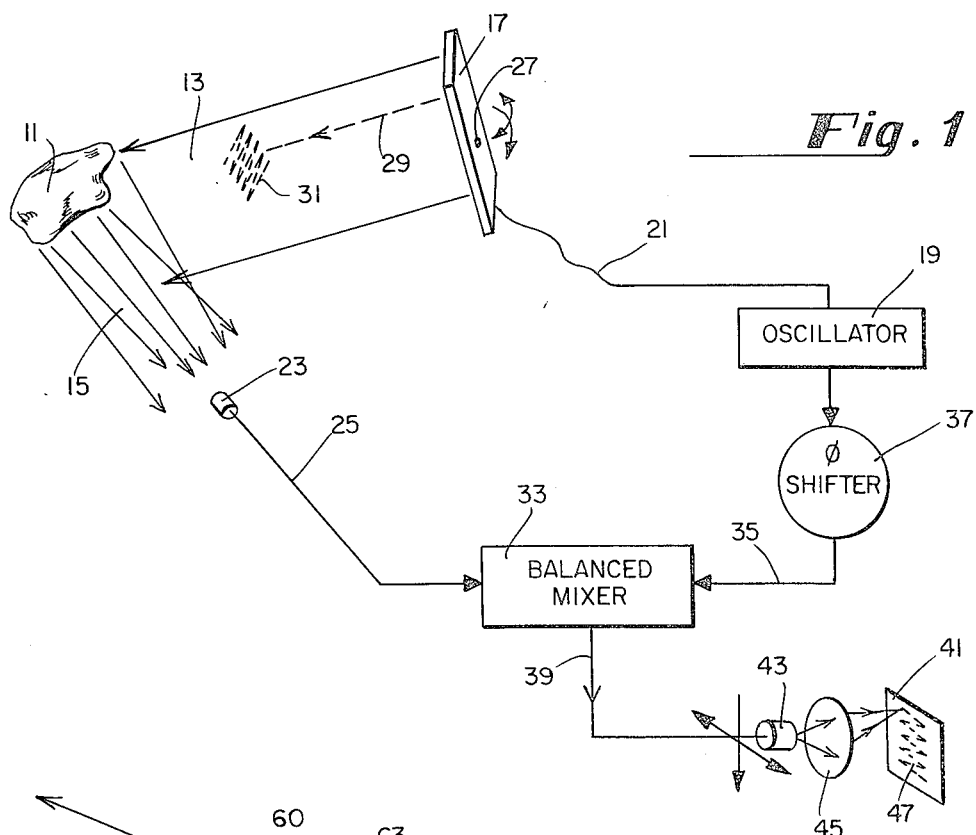
FIG. 1 is a schematic diagram of essential elements of a system for practicing one form of the present invention.

Referring to FIG. 1, a solid object 11 is illuminated with an ultrasonic energy object illuminating beam 13, thereby generating an ultrasonic object modified beam 15. A flat quartz transducer 17 generates the object illuminating beam 13 at a single coherent frequency upon excitation by an electronic oscillator 19. The oscillator 19 is appropriately electrically connected to the transducer 17. A radio frequency power amplifier may be desired for connection to the output of the oscillator 19 in order to provide an electrical signal that is strong enough to drive the transducer 17 in a manner to generate a coherent object illuminating beam 13 with enough intensity for a holographic application.

A substantially point radiation receiver 23 is positioned in the path of the object modified beam 15. The receiver 23 preferably includes a small quartz transducer for converting the compressional wave energy of the object modified beam 15 into an electrical signal in the circuit 25. The quartz transducer of the receiver 23 preferably has maximum dimensions equal to no more than a few wavelengths of the ultrasonic energy being utilized to image the object 11.

For ultrasonic energy to travel between the transducers and the object, a coupling medium must be provided. The object 11, the object illuminating beam transducer 17 and the point receiver 23 are preferably submersed in a liquid, such as water, which has good ultrasonic energy transmitting properties. However, the transmitting medium may be air or some other gaseous material but the ultrasonic energy losses will be higher. Yet another possibility for the ultrasonic transmitting medium is a solid material or some combination of a liquid and solid material. Furthermore, the configuration of FIG. 1 could be changed so that the portion of the object illuminating beam 13 which is transmitted through the object 11 is detected by the receiver 23 rather than having the reflected ultrasonic energy detected as shown.

The substantially point receiver 23 is held fixed with respect to the object 11. In order to obtain holographic information of the object 11 as if it were being viewed through a two-dimensional surface area across the object modified beam 15, the object illuminating beam 13 is scanned across the object 11, according to the technique of the present invention, by rotating the extended source transducer 17. The transducer 17 is rotated about a point 27 that is fixed in space relative to the object 11. The point 27 may either be coincident with the transducer 17 or displaced therefrom. The transducer 17 may be rotated in any one of a number of different patterns, one of which is indicated by the arrows on FIG. 1 near the point 27. Rotation as indicated by those arrows will cause a given ray 29 of the object illuminating beam 13 to scan a raster pattern 31 in space relative to the object 11.

It is preferable, for obtaining ordinary holographic information from which a three-dimensional image of the object 11 may be reconstructed, that the transducer 17 be rotated in a manner that the object illuminating beam 13 is scanned in two-dimensions relative to the object 11. This is what is shown in FIG. 1, as indicated by the ray 29 scanning a two-dimensional pattern 31. It will be noted that the object illuminating beam 13 is broad enough to flood portions of the object 11 of which holographic information is being obtained. It is only the angle of incidence of the object illuminating beam 13 against the object 11 that is changed by rotating the transducer 17 rather than changing the portion of the object 11 that is illuminated by such a rotation.

Since a reference beam is not used in the example the FIG. 1 to interfere with the object modified beam 15 at the receiver 23, an electrical signal must be mixed with the output signal 25 of the point receiver 23. This is necessary to electronically simulate a holographic off-axis interference pattern. In order to do this electronically, a balanced mixer 33 combines the electrical signal 25 from the receiver 23 with a reference signal 35 from the oscillator 19. A signal coherent with the electrical signal 21 that drives the transducer 17 is passed from the oscillator through a phase shifter 37 to form the reference electrical signal 35. The phase shifter 37 provides an off-axis simulation in the reference signal.

A type of phase sensitive detector is preferred for use as the balanced mixer 33 and a product detector type has been found to have many advantages. An electrical output 39 of the balanced mixer 33 is a time varying electrical analog signal of a hologram. The electrical analog signal 39 at the output of the balanced mixer 33 is a signal that is nearly direct current but which varies sinusoidally with the relative phase between the output signal 25 of the receiver 23 and the reference signal 35. It is this phase amplitude signal which, when recorded as transmission variations on a photographic film, forms the desired hologram from which an image of the object 11 may be reconstructed.

One possible way of forming an optical hologram from the electrical analog signal is shown in FIG. 1. A photosensitive material 41 is scanned by a substantially point light source 43 which is imaged onto the photosensitive material 41 by a lens 45. The intensity of the light source 43 is modulated according to the holographic electrical analog signal 39. The light source 43 is scanned as indicated by the arrows adjacent thereto of FIG. 1 in a manner that its point image is scanned over the photosensitive material 41 according to a raster pattern 47. The raster pattern 47 is similar to the raster pattern 31 with which the object illuminating beam 13 is scanned relative to the object 11. After this scanning is completed, the photo-sensitive material 41 is developed, if necessary for the particular material utilized to result in an optical hologram from which an optical image of the object 11 may be reconstructed. One alternative to constructing a hologram by scanning the light source 43 is to display the signal 39 on an oscilloscope and then photograph the display.

To reconstruct an image from the optical hologram 41, the hologram is illuminated with spatially coherent light which may also desirably be temporally coherent. The interference pattern recorded on the hologram 41 will diffract a portion of the reconstructing light radiation into an image carrying diffracted beam. An image of the object 11 is reconstructed in space in such a diffracted beam.

Figures 2, 4, 5:
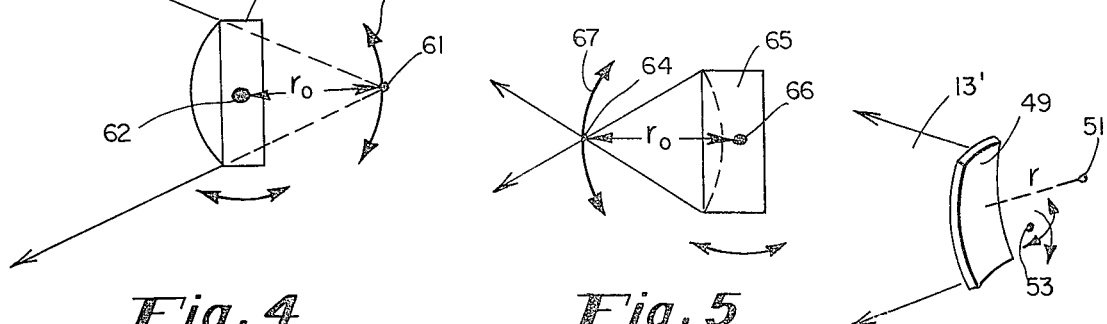
FIG. 2 shows a modification of the system of FIG. 1.
FIG. 4 schematically illustrates a spherical transducer of convex shape.
FIG. 5 schematically illustrates a spherical transducer of concave shape.

FIG. 1 has been described with respect to a flat extended transducer 17 of finite dimensions. It is also possible to practice the present invention by substituting a spherically shaped transducer 49 of FIG. 2 for the transducer 17 of FIG. 1. The spherical transducer 49 is preferably a piezoelectric transducer with a center of curvature 51. The center of curvature 51 is also the apparent point source of the generated object illuminating beam 13'. When the transducer 49 is used in the embodiment of FIG. 1 in place of the flat transducer 17, the transducer 49 of FIG. 2 is rotated about a point 53 that is fixed in space relative to the object 11. The object illuminating beam 13' is thereby scanned with respect to the object 11. The point 53 may be any convenient point in space other than the center of curvature 51 of the spherical transducer 49.

In implementing the rotation of the object illuminating transducer about a point in space fixed relative to the object being illuminated, the transducer may be held by some convenient mechanical holder that passes through the point about which the transducer is to rotate. This point of the holder is then held fixed with respect to the object in a manner that the holder and transducer are allowed to rotate.

Figure 3:
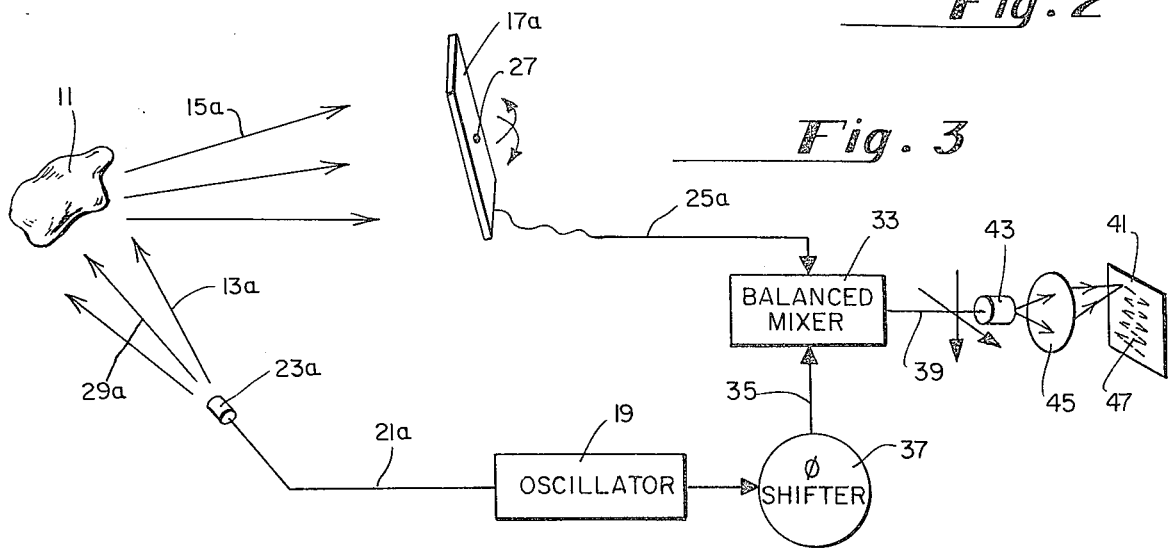
FIG. 3 is a schematic diagram of a system for practicing another form of the present invention which is the reciprocal case of the form shown in FIG. 1.

Referring to FIG. 3, there is illustrated a schematic diagram of a system for practicing another form of the present invention which is the reciprocal case of the form shown in FIG. 1. Similar parts have been identified with the same reference characters. In FIG. 3 the solid object 11 is illuminated with ultrasonic energy from a substantially point radiation transducer 23a thereby generating an ultrasonic object-modified beam 15a. The small quartz transducer 23a generates the object illuminating beam 13a and a single coherent frequency upon excitation by the electronic oscillator 19 which is electrically connected therewith. An extended area radiation receiver 17a is positioned in the path of the object-modified beam 15a. The receiver 17a is illustrated as a flat quartz transducer for converting the compressional wave energy of the object-modified beam 15a into an electrical signal in the circuit 25a.

The substantially point radiation source 23a is held fixed with respect to the object 11. In order to obtain holographic information of the object 11, the object-modified beam 15a is scanned across the receiver 17a, according to the technique of the present invention, by rotating the extended receiver transducer 17a. The transducer 17a is rotated about point 27 that is fixed in space relative to the object 11. The point 27 may either be coincident with the transducer 17a or displaced therefrom. The transducer 17a may be rotated in any one of a number of different patterns, one of which is indicated by the arrows on FIG. 3 near the point 27. Rotation as indicated by those arrows will cause a given ray 29a of the object illuminating beam 13a to scan a raster pattern in space relative to the object 11 similar to that illustrated in FIG. 1.

The transducer 17a is rotated in a manner that the object-modified beam 15a is scanned in two-dimensions relative to the object 11.

The system in FIG. 3 is similar to that in FIG. 1 in that a reference beam is not used to interfere with the object-modified beam 15a at the receiver 17a but instead an electrical signal is mixed with the output signal 25a of the receiver 17a. This electronically simulates a holographic off-axis interference pattern. Similar to the example in FIG. 1, a balanced mixer 33 combines the electrical signal 25a from the receiver 17a with a reference signal 35 from the oscillator 19. A signal coherent with the electrical signal 21a that drives the transducer 23a is passed from the oscillator through a phase shifter 37 to form the reference electrical signal 35. The phase shifter 37 provides an off-axis simulation in the reference signal.

The electrical output 39 of the balanced mixer 33 is a time varying electrical analog signal of the hologram. The electrical analog signal 39 at the output of the balanced mixer 33 is a signal that is nearly direct current but which varies sinusoidally with the relative phase between the output signal 25a of the receiver 17a and the reference signal 35. It is this phase amplitude signal which, when recorded as transmission variations on a photographic film, forms the desired hologram from which the image of the object 11 may be reconstructed. The method of forming an optical hologram from the electrical analog signal shown in FIG. 3 is the same as that illustrated in FIG. 1 and thus the description of operation will not be repeated.

While the system in FIG. 3 has been described with respect to a flat extended transducer 17a of finite dimensions, it is also possible to practice the present invention by substituting a curved transducer of extended area. By way of example, the spherically shaped transducer 49 of FIG. 2 may be substituted for the plain extended receiver 17a of FIG. 3. A curved extended receiver can be used as long as the center of curvature and the center of nutation do not coincide.

While the systems described and illustrated in connection with FIGS. 1-3 have utilized mechanical movement by either of the source or receiver, it is also possible to practice the present invention without such mechanical movement by electronically producing apparent motion. Referring to FIG. 4 there is illustrated a convex spherical transducer 60 which represents an effective point source 61 at its center of curvature having a radius $r_o$. Similarly, in FIG. 5 there is illustrated a spherical transducer 65 of concave shape representing an effective point source 64 at point having a radius $r_o$. When the concave transducer 65 nutates about its center of curvature 66 this moves the effective point source 64 over an arc 67 having a radius $r_o$. Thus it will be seen that a spherical transducer of either convex or concave shape represents an effective point source at its center of curvature and nutation of such a transducer moves this effective point in an arc.

Thus it will be seen that a nutating convex transducer will move the effective point source over a concave arc and vice versa. An array of point transducers arranged on the arc traversed by the effective point of the extended transducer can then be substituted for the extended transducer. The elements for point transducers of the array can be switched on and off in a sequence so that apparent motion occurs. Thus, a stationary array arranged on a curved surface can be substituted for a mechanically scanned transducer. Systems embodying this concept of the invention are schematically illustrated in FIGS. 6 and 7. FIG. 6 is similar to the system illustrated in FIG. 3 except the receiver comprises a spherical array of point transducers which are switched on and off in a sequence so that apparent motion occurs rather than mechanical movement or nutation of the receiver as in the case of the extended receiver 17a in FIG. 3. In FIG. 6 the receiver 70 comprises a plurality of point transducers 71 which are arranged along the curved arc of the receiver 70 to provide a spherical array. The individual elements 71 of the spherical array 70 are connected to suitable electrical commutating means illustrated as commutator 72. The solid object 11 is illuminated with ultrasonic energy from the substantially point radiation transducer 23a thereby generating an ultrasonic object-modified beam 15a. The spherical array receiver 70 is positioned in the path of the object-modified beam 15a and the individual point transducers 71 are switched on and off in sequence along the arc of the receiver 70 so that apparent motion occurs with respect to the stationary object 11. The receiver converts the compressional wave energy of the object-modified beam 15a into an electrical signal in the circuit 25b to the balanced mixer 33 where the electrical signal 25b from the receiver 70 is combined with a reference signal 35 from the oscillator 19. A signal coherent with the electrical signal 21a that drives the transducer 23a is passed from the oscillator through the phase shifter 37 to form the reference electrical signal 35. The phase shifter 37 provides an off-axis simulation in the reference signal. The electrical analog signal 39 at the output of the balanced mixer 33 is utilized to form an optical hologram in the same manner as previously described in connection with the systems of FIGS. 1 and 3.

As previously described in connection with FIGS. 1 and 3, the role of the source and receiver can be exchanged. Similarly, the role of source and receiver array can be exchanged as illustrated in FIG. 7. In this system the spherical array is the transmitter 80 comprising as elements thereof individual point transducers 81 which are arranged on the curved surface of the transmitter 80. The point transducers 81 are turned on and off in sequence to provide the object illuminating beam 13b thereby generating the ultrasonic object-modified beam 15b which is directed to the substantially point radiation receiver 23. The individual elements 81 of the spherical array transmitter 80 are turned on and off in sequence by the commutating means illustrated as commutator 82 upon excitation by the electronic oscillator 19. The remainder of the circuit illustrated in FIG. 7 is similar to that illustrated and described in connection with FIG. 1. It will be seen that by energizing the point transducers 81 in sequence the beam 13b will be caused to scan the stationary object 11 similar to the mechanical nutation of the extended transmitter 17 in FIG. 1. Thus, although no physical movement takes place with the transmitter 80, there is apparent motion of the beam 13b by virtue of the sequential operation of the individual transducers 81 of the spherical array transmitter 80.

While the present invention has been described utilizing a separate transducer for the source and another transducer for the receiver, it is to be understood that a single transducer may be used as both source and receiver. A system of this type has been schematically illustrated in FIG. 8 where a single extended transducer 17b is used as both the source and receiver while nutating about point 27. In this system the transducer 17 is energized through a transmit-receive switch 85 so that pulsed radiation is supplied to the transmitter 17b which enables the transducer 17b to be free to be used as a receiver when the echo from the object 11 arrives. Thus it will be seen that when the transducer 17b is transmitting the solid object 11 is illuminated with an ultrasonic energy object illuminating beam 13. When the illuminating beam 13 strikes the object 11 there is produced an echo in the form of an ultrasonic object-modified beam 15c which is directed back toward the transducer 17b. By utilizing pulsed radiation the transducer 17b serves as a receiver between pulses of beam 13 and thus it is free to receive the object-modified beam 15c between pulses. The transducer 17b is adapted to be nutated about point 27 in manner similar to that previously described in connection with FIGS. 1 and 3. Additionally, the other components of the circuit are similar to those previously described and thus further explanation is not believed necessary.

While a flat extended transducer has been illustrated in FIG. 8 which can be used as both source and receiver while nutating, it is to be understood that similarly an array can be used in pulsed operation. The array would be similar to the array 70 or 80 illustrated in FIGS. 6 and 7 with each element of the array being sequentially pulsed to transmit and then listen for the echo from the object 11. Other than for the array the system would be similar to that illustrated in FIG. 8.

It will be seen that sector scanning in accordance with the present invention provides various practical advantages where large apertures are not readily available. These situations are found, for example, in medicine since many of the body's internal organs are protected by bone covering. Some examples are the heart and brain. Fortunately, there are small apertures giving access to both these organs. The heart, for example, may be seen through the intercostal spaces between the ribs. A transducer can be pressed against the chest between two ribs and sector scanned in such a way as to illuminate the whole heart. For example, a single transducer having a 1 inch diameter and 4 inch focal length can be placed between ribs to illuminate the heart and then nutated to form a large hologram. If the nutation angle is 40°, for example, the hologram mentioned will be about 3 inches. Thus, the whole heart, even though covered by a series of ribs can be imaged by holography in accordance with the present invention. With regard to the brain it may be scanned through the temporal area of the skull. For brain imaging a spherical array may be used to approximate the shape of the skull and thus form a hologram.

The present invention also has other applications such, for example, as underwater imaging and radar imaging. Underwater vehicles usually have their sonar arrays shaped to conform to the spherical shape of the bow. With the present invention these arrays may be used for holography as well as echo ranging. In regard to radar imaging most radar systems are mechanically scanned spherical reflectors with point source at the focus. The present invention allows the use of these arrays for holography as well as echo-ranging.

The preferred embodiments of the invention having been described, there will now be described a theoretical analysis of the sector scan system which reveals hidden advantages from such invention, such, for example, as undistorted imaging at prescribed ranges.

ANALYSIS

Figure 9:
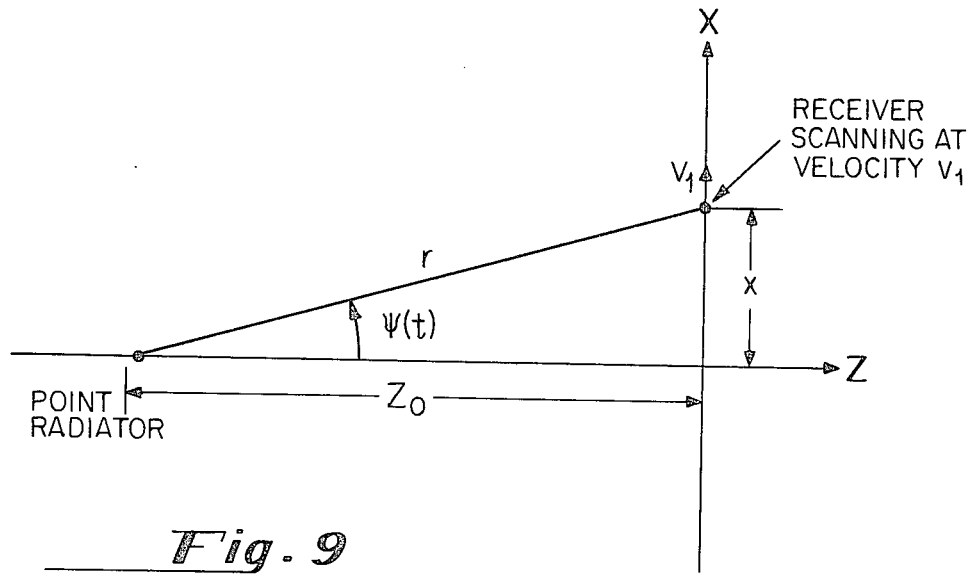

Proceeding with the analysis as presented by Meir; i.e., I assume a point object and investigate the phase properties of the hologram.[1] In order to make the analysis as simple as possible, I will first review the standard planar scan shown in FIG. 9.

[1] R. W. Meier, "Magnifications and Third-Order Aberrations in Holography," J. Opt. Soc. Am. 55:987 (1965)

In this case a stationary point source illuminates the object and a moving receiver scans the hologram plane. The phase at the receiver is $$\phi(x) = k_1 r(x) \tag{1}$$

where $$k_1 = 2\pi/\lambda_1$$

Since $r$ can be written as $[Z_0^2 + x^2]^{1/2}$ we can obtain the spatial frequency in the hologram plane as $$\omega(x) = d\phi(x)/dx = k_1 (x/r) \tag{2}$$

which for small angle $\psi$, can be approximated by $$\omega(x) = k_1 (x/z_0) \tag{3}$$

If a phase detector is used, the spatial phase variation is changed to the time varying electronic signal $$s(t) = A \cos k_1 r(v_1 t) \tag{4}$$

where $v_1$ is the scan velocity.

This signal is used to write the hologram on film by modulating a light source and translating it across the film at velocity, $v$. Since $s(t)$ is bi-polar, and light intensity is not, we use the signal $$s'(t) = B + A \cos k_1 r(v_1 t) \tag{5}$$

where $B \geq A$

The transmissivity of the film therefore becomes $$T(y) = B + A \cos k_1 r(yv_1/v) \tag{6}$$

where $y = vt$

If we now illuminate the film with a plane wave of wave number $k_2$ perpendicular to the hologram we obtain the phase terms $$\phi(y) = \pm k_2 \left[ (k_1/k_2) r(yv_1/v) \right] \tag{7}$$

where $k_2 = 2\pi/\lambda_2$,
which describe a converging and diverging spherical wave with focal lengths of $$z_b = (k_2/\pm k_1)(v/v_1)^2 \qquad z_o = (k_2/\pm k_1) m^2 z_0 \tag{8}$$

where $m = v/v_1$

Note that this can be obtained from a look at the spatial frequency $$\omega(y) = d\phi(y)/dy = \pm \{(k_1/k_2)(v_1/v)^2 \left[ y/r(yv_1/v) \right]\} \tag{9}$$

which for small angles becomes $$\omega(y) \approx k_2 \left\{ \frac{y}{\pm \frac{k_2}{k_1}\left(\frac{v}{v_1}\right)^2 z_0} \right\} = k_2 \left\{ \frac{y}{\pm \frac{k_2}{k_1} m^2 z_0} \right\} \quad (10)$$

Comparing Equations 10 and 8, we see that the focal length is equal to the inverse slope of the linear spatial frequency modulation in the first order approximation to $\omega(y)$.

Figure 10:
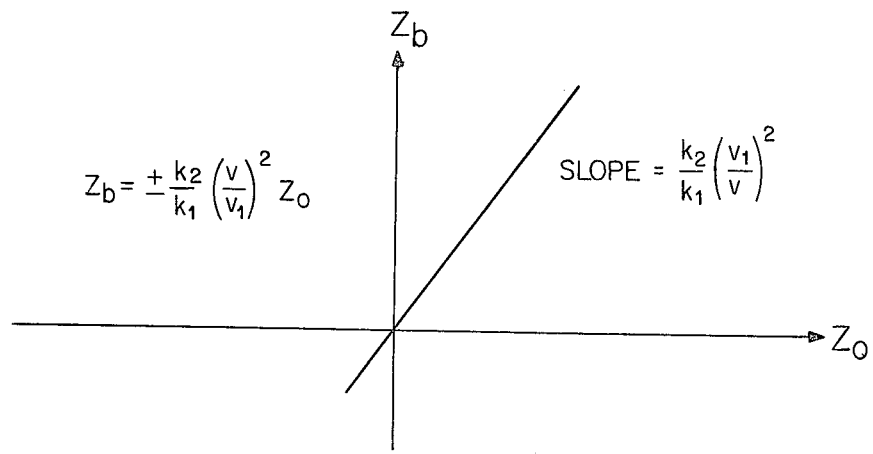

We note that the image distance is directly proportional to the object distance. In order to emphasize this we plot equation 8 in FIG. 10. Note that magnification can be defined as the slope of the curve, and for this particular case is constant $$M_R = k_2/k_1 \, m^2 \quad (11)$$

The lateral position of the image lies on the line passing through the apparent center of the zone plate along the axis of propagation of the reconstructing plane wave is simply $$x_b = m x_o \quad (12)$$

with the slope $M_L = m$ \quad (13)

A comparison of Eqns. (11) and (13) reveals the distortion inherent in acoustical holography. That is $$M_R = (k_2/k_1) \, M_L^2 \quad (14)$$

Figure 11:
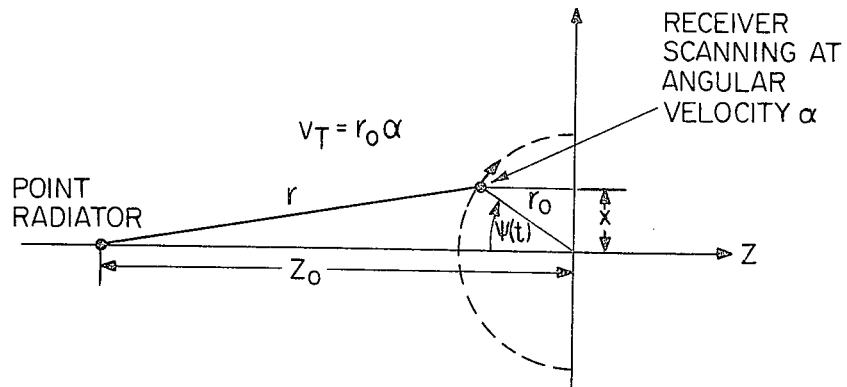

In the sector scan system we have the situation described in FIG. 11. We have included a sketch of how this case might be generated physically simply by nutating a focused transducer about itself. This is shown in FIG. 5.

The phase detected by the receiver is $$\phi(t) = k_1 r(t) \quad (15)$$

where $r(t) = [z_o^2 + r_o^2 - 2 r_o z_o \cos \psi(t)]^{1/2}$ \quad (16)

The instantaneous frequency is $$\omega(t) = d\phi/dt = k_1 \, (r_o z_o/r(t)) \sin \psi(t) \, d\psi/dt \quad (17)$$

Noting that $r_o \sin \psi = x$ and assuming a constant angular rotation rate $\alpha$ we have $$\omega(x) = k_1 [z_o/r(x)] \alpha x \approx k_1 \alpha x \quad (18)$$

A quick comparison of Equations 18 and 3 shows a marked similarity except for the constants. Note, however, that the spatial frequency is now nearly independent of range.

We again detect the phase and write it on film at velocity $v$, yielding the transmissivity $$T(y) = B + A \cos k_r r \quad (19)$$

where $r$ is now expressed by $$r(\alpha y/v) = [z_o^2 + r_o^2 - 2 r_o z_o \cos \alpha y/v]^{1/2}$$

When the film is illuminated as before, we obtain the phase distributions $$\phi(y) = \pm k_2 \, [(k_1/k_2) \, r(\alpha y/v)] \quad (20)$$

The corresponding spatial frequency is $$\omega(y) = \{[d\phi(y)/dy] = \pm k_2 \, [(k_1/k_2) \, (\alpha/v) \, [\sin \alpha y/v/r(\alpha y/v)]\} \, r_o z_o \quad (21)$$

which for small argument $\alpha y/v$, becomes $$\omega(y) \approx \pm k_2 \, \{(k_1/k_2) \, (\alpha/v)^2 \, [y \, r_o z_o/(z_o - r_o)]\} \quad (22)$$

If we rewrite this in the form used in Equation 10 we obtain $$\omega(y) = k_2 \left\{ \frac{y}{\pm \frac{k_1}{k_2} \left(\frac{v}{\alpha}\right)^2 \left(\frac{1}{z_o} - \frac{1}{r_o}\right)} \right\} \quad (23)$$

Thus, this hologram will have the focal length $$z_b = (k_2/\pm k_1) \, (v/\alpha)^2 \, [(1/z_o) - (1/r_o)]$$
$$= (k_2/\pm k_1) \, (v/v_t)^2 [(1/z_o) - (1/r_o)] r_o^2 \quad (24)$$

$$= (k_2/\pm k_1) \, m^2 r_o^2 \, [(1/z_o) - (1/r_o)] \quad (24)$$

where $v_t = \alpha r_o$, the tangential velocity, $m = (v/v_t)$

Figure 12:
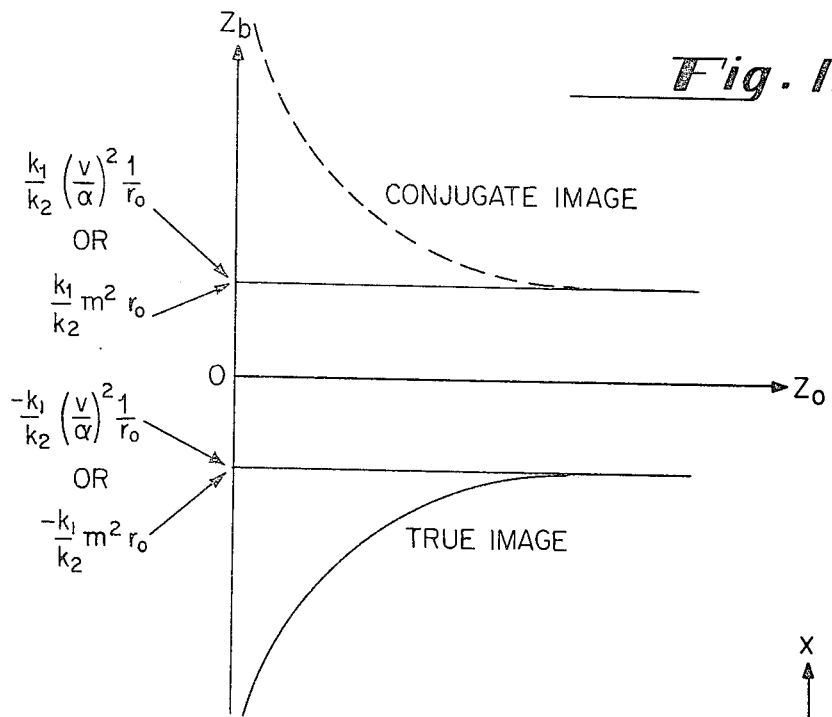

This equation is plotted in FIG. 12. Several interesting deductions can be made from this equation. First, the curve asymptotically approaches the horizontal line.

$$z_b = (k_2/k_1) \, m^2 z_o \quad (25)$$

Secondly, the slope of the curve attains all values between zero and infinity.

$$M_R = (k_2/\pm k_1) \, m^2 \, (r_o/z_o)^2 \quad (26)$$

We are free to choose its value by choosing the ratio $r_o/z_o$ appropriately. Since the lateral position of the image is still proportional to object position in a linear way; namely $$x_b = (v/\alpha) \, (x_o/z_o) = m x_o (r_o/z_o) \quad (27)$$

yielding the lateral magnification $$M_L = m r_o/z_o \quad (28)$$

we can obtain undistorted imaging for a region in space about some $z_o$ by setting $M_R = M_L$ and solving for $r_o$. The value for $r_o$ to achieve this is $$r_0 = (k_1/\pm mk_2) z_0 \tag{29}$$

Figure 13:
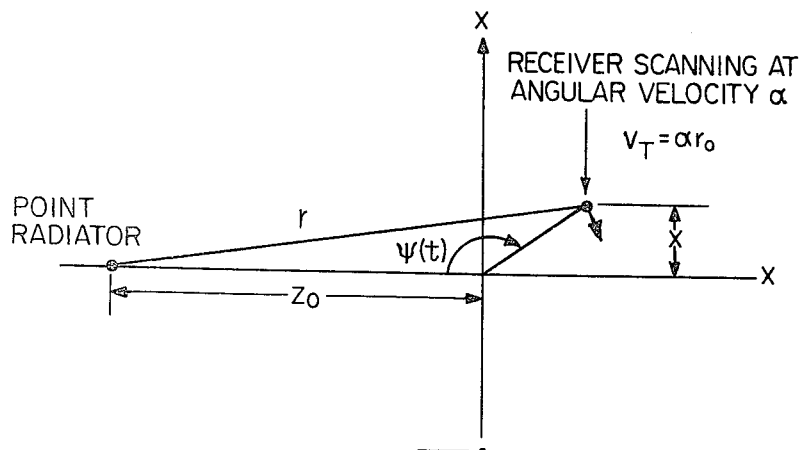
Figure 14:
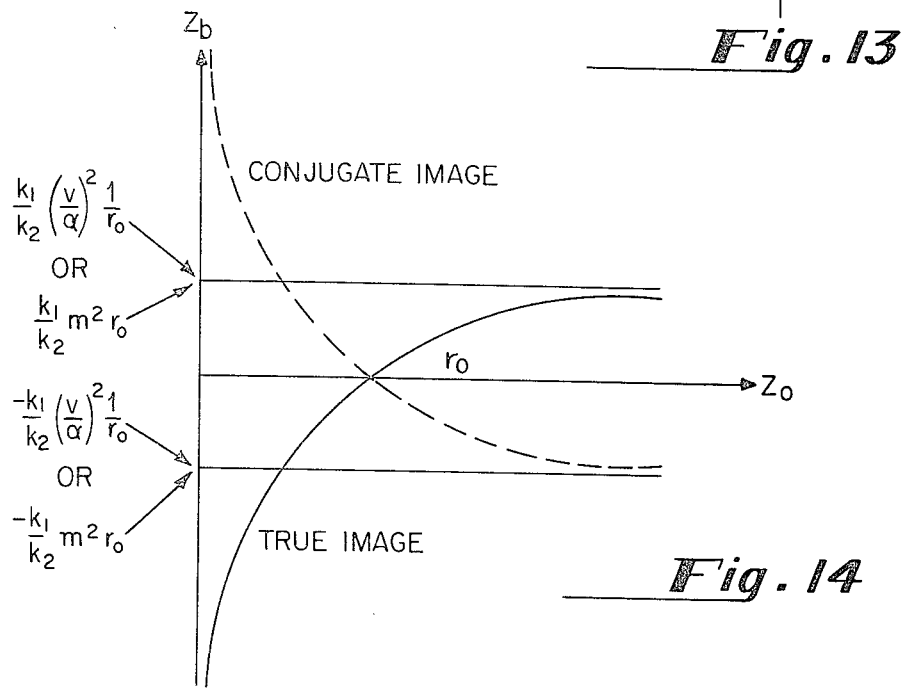

FIG. 13 presents the case where a concave spherical surface is scanned by means of a nutating spherical transducer. The mathematics for this arrangement is very similar to the convex surface and is summarized in the curve in FIG. 14. Note that in this case image distances are reversed; near points in the object appear distant in the image and vice-versa.

Since source-receiver reciprocity holds, the source may be nutated while the receiver remains stationary. Alternatively, the object may be rotated about some point while source and receiver remain stationary. This is a well established technique in radar astronomy where the rotation of the planets allow them to be mapped from earth. [2] In this case one can use a single transducer as both source and receiver by pulsed operation. The analogy between planetary mapping radars and holography was previously pointed out by Leith and served to inspire me to use the type of analysis described above.[3] 2. T. Hagfors and J. M. Moran, "Detection and Estimation Practices in Radio and Radar Astronomy," Proc. IEEE 58:743 (1970).

3. E. N. Leith, "Quasi-Holographic Techniques in the Microwave Region," Proc. IEEE 57:2162 (1971).

An interesting outcome from the analysis is that a plane wave transducer can be used. In this case $r_0 \rightarrow \infty$ with the result that the curves in FIGS. 12 and 14 approach the $z_0$ axis asymptotically.

We can no longer use the version of the formulas containing $v_t$ since it would necessarily approach infinity. We must revert to the forms using angular velocity. In this arrangement no curvature of the scan surface is produced since it is equivalent to scanning a point detector on a plane at infinity.

It shall be understood that the invention is not limited to the specific arrangements shown, and modifications may be made within the scope of the appended claims.

What is claimed is:

1. A method of producing holographic information of an object scene, comprising the steps of:
    illuminating the object scene with a coherent radiation beam that is generated by a substantially point radiation source fixed relative to the object,
    positioning an extended radiation receiver of finite size in two dimensions relative to the object scene to detect radiation from said beam after modification by the object scene,
    rotating said extended radiation receiver about a point fixed with respect to the object scene in a manner that the modified beam from the object scene is scanned over said extended radiation receiver, and
    mixing a reference signal with the object modified radiation striking the extended radiation receiver, said reference signal being mutually coherent with said object scene illuminating beam, thereby producing a holographic information signal of the object scene.

2. The method according to claim 1 wherein the step of rotating said extended radiation receiver includes a rotation which causes said modified beam from the object scene to be scanned in two dimensions over said extended radiation receiver.

3. The method according to claim 1 wherein said extended radiation receiver comprises an ultrasonic transducer including a flat quartz sheet.

4. The method according to claim 1 wherein said extended radiation receiver comprises a transducer including a spherical piezo-electric material having a center of curvature, said spherical material being rotated about a point fixed with respect to said object scene that is not conincident with the spherical center of curvature.

5. A method of producing holographic information of an object scene comprising the steps of:
    illuminating the object scene with a coherent radiation beam that is generated by radiation source means,
    positioning radiation receiver means relative to the object scene to detect radiation from said beam after modification by the object scene,
    one of said means having an extended area comprising a plurality of individual point transducers arranged over a spherical surface to provide a spherical array,
    effecting nutation of said extended area means about a point fixed with respect to said object scene by energizing said individual point transducers in a pre-determined sequence so that the object modified radiation is scanned over said radiation receiver means, and
    mixing a reference signal with the object modified radiation striking said receiver means, said reference signal being mutually coherent with said beam illuminating the object scene, thereby producing a holographic information signal of the object scene.

6. The method of claim 5 wherein said extended area means is utilized for illuminating the object scene with coherent radiation.

7. The method according to claim 5 wherein said extended area means is utilized for receiving the object modified radiation.

8. A method of producing holographic information of an object scene, comprising the steps of:
    illuminating the object scene with a coherent radiation beam that is generated by radiation source means,
    positioning radiation receiver means relative to the object scene to detect radiation from said beam after modification by the object scene, said radiation source means and said radiation receiver means comprising a transducer having an extended area of finite size in two dimensions and which is operated by pulsed radiation and used alternately as the radiation source and radiation receiver so that the transducer is effective as a receiver when the echo from the object arrives in the form of object-modified radiation,
    effecting nutation of said transducer about a point fixed with respect to said object scene in a manner that the object modified radiation is scanned over said radiation receiver means, and
    mixing a reference signal with the object modified radiation striking said receiver means, said reference signal being mutually coherent with said beam illuminating the object scene, thereby producing a holographic information signal of the object scene.

9. The method according to claim 8 wherein said transducer comprises a plurality of individual point transducers arranged over a spherical surface to provide a spherical array and the step of effecting nutation of said extended area means is accomplished by energizing said individual point transducers in predetermined sequence to provide sector scanning 10. A method of producing holographic information of an object scene, comprising the steps of:
  illuminating the object scene with a coherent radiation beam that is generated by radiation source means,
  positioning radiation receiver means having an extended area of finite size in two dimensions relative to the object scene to detect radiation from said beam after modification by the object scene,
  effecting nutation of said receiver means by rotating said receiver means about a point fixed with respect to said object scene in a manner that the object modified radiation is scanned over said radiation receiver means, and
  mixing a reference signal with the object modified radiation striking said receiver means, said reference signal being mutually coherent with said beam illuminating the object scene thereby producing a holographic information signal of the object scene.

11. Apparatus for producing holographic information of an object scene comprising radiation source means for illuminating the object scene with a coherent radiation beam,
  radiation receiver means of extended area and positioned relative the object scene to detect radiation from said beam after modification by the object scene,
  means for effecting nutation of said extended area mans about a point fixed with respect to said object scene in a manner that the object-modified radiation is scanned over said radiation receiver means, and
  means for mixing a reference signal with the object modified radiation striking said receiver means, said reference signal being mutually coherent with said beam illuminating the object scene, thereby producing a holographic information signal of the object scene.

12. Apparatus for producing holographic information of an object scene comprising radiation source means including an array of individual point transducers arranged over a spherical surface to provide a spherical array for illuminating the object scene with coherent radiation beam,
  radiation receiver means positioned relative to the object scene to detect radiation from said beam after modification by the object scene,
  means for cyclicly energizing ones of said individual point transducers of said array in a manner that the object modified radiation is scanned over said radiation receiver means, and
  means for mixng a reference signal with the object modified radiation striking said receiver means, said reference signal being mutually coherent with said beam illuminating the object scene, thereby producing a holographic information signal of the object scene.

13. Apparatus for producing holographic information of an object scene comprising radiation source means for illuminating the object scene with a coherent radiation beam,
  radiation receiver means comprising an array of individual point transducers arranged over a spherical surface to provide a spherical array for detecting radiation from said beam after modification by the object scene,
  means for cyclicly energizing ones of said individual point transducers of said array in a manner that the object modified radiation is scanned over said radiation receiver means, and
  means for mixing a reference signal with the object modified radiation striking said receiver means, said reference signal being mutually coherent with said beam illuminating the object scene, thereby producing a holographic information signal of the object scene.

14. Apparatus for producing holographic information of an object scene, comprising:
  transducer means alternately energizable to comprise radiation source means for illuminating the object scene with a coherent radiation beam and radiation receiver means to detect radiation from said beam after modification by the object scene,
  means for electrically pulsing the operation of said transducer means,
  means for effecting nutation of said transducer means about a point fixed with respect to said object scene in a manner that the object-modified radiation is scanned over said transducer means, and
  means for mixing a reference signal with the object modified radiation striking said receiver means, said reference signal being mutually coherent with said beam illuminating the object scene, thereby producing a holographic information signal of the object scene.

15. Apparatus according to claim 14 wherein said transducer means comprises an array of individual point transducers arranged over a spherical surface to provide a spherical array.

* * * * *